(12) United States Patent
Rao et al.

(10) Patent No.: US 7,986,827 B2
(45) Date of Patent: Jul. 26, 2011

(54) SYSTEM AND METHOD FOR MULTIPLE INSTANCE LEARNING FOR COMPUTER AIDED DETECTION

(75) Inventors: R. Bharat Rao, Berwyn, PA (US); Murat Dundar, Malvern, PA (US); Balaji Krishnapuram, Phoenixville, PA (US); Glenn Fung, Madison, WI (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1005 days.

(21) Appl. No.: 11/671,777

(22) Filed: Feb. 6, 2007

(65) Prior Publication Data

US 2007/0189602 A1 Aug. 16, 2007

Related U.S. Application Data

(60) Provisional application No. 60/765,922, filed on Feb. 7, 2006.

(51) Int. Cl.
*G06K 9/62* (2006.01)
*G06K 9/00* (2006.01)
*G06E 1/00* (2006.01)

(52) U.S. Cl. ............ 382/159; 382/224; 382/128; 706/20

(58) Field of Classification Search .......... 382/128–131, 382/155–161, 224–229; 706/20
See application file for complete search history.

(56) References Cited

U.S. PATENT DOCUMENTS

| | | | | |
|---|---|---|---|---|
| 5,465,308 A * | 11/1995 | Hutcheson et al. | ............ | 382/159 |
| 5,544,256 A * | 8/1996 | Brecher et al. | ................ | 382/149 |
| 5,598,509 A * | 1/1997 | Takahashi et al. | .............. | 706/20 |
| 5,835,901 A * | 11/1998 | Duvoisin et al. | ................ | 706/19 |
| 5,923,837 A * | 7/1999 | Matias | ............................ | 714/38 |
| 5,943,056 A * | 8/1999 | Sato et al. | ....................... | 345/419 |
| 5,987,445 A * | 11/1999 | Rao et al. | ........................ | 706/61 |
| 6,018,590 A * | 1/2000 | Gaborski | ....................... | 382/168 |
| 6,205,348 B1 * | 3/2001 | Giger et al. | ................... | 600/407 |
| 6,269,176 B1 * | 7/2001 | Barski et al. | ................... | 382/128 |
| 6,317,517 B1 * | 11/2001 | Lu | ................................. | 382/228 |
| 6,609,021 B1 * | 8/2003 | Fan et al. | ....................... | 600/425 |
| 6,629,065 B1 * | 9/2003 | Gadh et al. | ....................... | 703/1 |
| 6,630,660 B1 * | 10/2003 | Finn | .......................... | 250/237 G |

(Continued)

OTHER PUBLICATIONS

Fung et al Multiple Instance Learning for Computer Aided Diagnosis_pp. 1-8.*
Pudil et al Novel Methods for Subset Selection with Respect to Problem Knowledge_pp. 1-9.*

(Continued)

*Primary Examiner* — Bhavesh M Mehta
*Assistant Examiner* — Mia M Thomas
(74) *Attorney, Agent, or Firm* — Peter Withstandley

(57) ABSTRACT

A method of training a classifier for computer aided detection of digitized medical image, includes providing a plurality of bags, each bag containing a plurality of feature samples of a single region-of-interest in a medical image, where each region-of-interest has been labeled as either malignant or healthy. The training uses candidates that are spatially adjacent to each other, modeled by a "bag", rather than each candidate by itself. A classifier is trained on the plurality of bags of feature samples, subject to the constraint that at least one point in a convex hull of each bag, corresponding to a feature sample, is correctly classified according to the label of the associated region-of-interest, rather than a large set of discrete constraints where at least one instance in each bag has to be correctly classified.

19 Claims, 4 Drawing Sheets

U.S. PATENT DOCUMENTS

| | | | |
|---|---|---|---|
| 6,678,413 B1* | 1/2004 | Liang et al. | 382/181 |
| 6,750,964 B2* | 6/2004 | Levenson et al. | 356/326 |
| 7,024,033 B2* | 4/2006 | Li et al. | 382/159 |
| 7,092,749 B2* | 8/2006 | Fowkes et al. | 600/407 |
| 7,099,505 B2* | 8/2006 | Li et al. | 382/159 |
| 7,263,214 B2* | 8/2007 | Uppaluri et al. | 382/128 |
| 7,295,691 B2* | 11/2007 | Uppaluri et al. | 382/130 |
| 7,346,201 B2* | 3/2008 | Ashton | 382/128 |
| 7,463,773 B2* | 12/2008 | Lee et al. | 382/218 |
| 7,536,044 B2* | 5/2009 | Zhou et al. | 382/128 |
| 7,650,321 B2* | 1/2010 | Krishnan et al. | 706/60 |
| 7,702,596 B2* | 4/2010 | Tu et al. | 706/20 |
| 7,796,795 B2* | 9/2010 | Uppaluri et al. | 382/128 |
| 2001/0043729 A1* | 11/2001 | Giger et al. | 382/128 |
| 2002/0069206 A1* | 6/2002 | Bergman et al. | 707/100 |
| 2003/0215119 A1* | 11/2003 | Uppaluri et al. | 382/128 |
| 2003/0215120 A1* | 11/2003 | Uppaluri et al. | 382/128 |
| 2004/0101181 A1* | 5/2004 | Giger et al. | 382/128 |
| 2004/0131254 A1* | 7/2004 | Liang et al. | 382/181 |
| 2004/0165767 A1* | 8/2004 | Gokturk et al. | 382/159 |
| 2005/0010106 A1* | 1/2005 | Lang et al. | 600/425 |
| 2005/0069183 A1* | 3/2005 | Ashton | 382/128 |
| 2005/0096539 A1* | 5/2005 | Leibig et al. | 600/437 |
| 2005/0177040 A1* | 8/2005 | Fung et al. | 600/407 |
| 2005/0209519 A1* | 9/2005 | Krishnan et al. | 600/437 |
| 2006/0045337 A1* | 3/2006 | Shilman et al. | 382/181 |
| 2006/0064017 A1* | 3/2006 | Krishnan et al. | 600/450 |
| 2006/0074908 A1* | 4/2006 | Selvaraj et al. | 707/6 |
| 2006/0184475 A1* | 8/2006 | Krishnan et al. | 706/20 |
| 2006/0222221 A1* | 10/2006 | Sathyanarayana | 382/128 |
| 2006/0247514 A1* | 11/2006 | Panasyuk et al. | 600/410 |
| 2006/0271556 A1* | 11/2006 | Mukherjee et al. | 707/10 |
| 2007/0011121 A1* | 1/2007 | Bi et al. | 706/20 |
| 2007/0081710 A1* | 4/2007 | Hong et al. | 382/128 |
| 2007/0110292 A1* | 5/2007 | Bi et al. | 382/128 |
| 2007/0280530 A1* | 12/2007 | Fung et al. | 382/159 |
| 2008/0031507 A1* | 2/2008 | Uppaluri et al. | 382/132 |
| 2008/0109388 A1* | 5/2008 | Rosales et al. | 706/12 |
| 2008/0118124 A1* | 5/2008 | Madabhushi et al. | 382/128 |
| 2008/0301077 A1* | 12/2008 | Fung et al. | 706/46 |
| 2008/0317308 A1* | 12/2008 | Wu et al. | 382/128 |
| 2009/0080731 A1* | 3/2009 | Krishnapuram et al. | 382/128 |
| 2009/0180669 A1* | 7/2009 | Horovitz et al. | 382/103 |
| 2011/0026798 A1* | 2/2011 | Madabhushi et al. | 382/131 |

OTHER PUBLICATIONS

Dhillon et al. "Class Visualization of High Dimensional Data With Applications" Computational Stats and Data Analysis, 2002, vol. 41, pp. 59-90.*

Iwata et al. "Parametrix Embedding of Class Visualization" Neural Computation 19, 2356-2556, 2004.*

Globerson er al. "Euclidean Embedding of Co-Occurence Data" NIPS, 2004.*

Mika et al., "A Mathematical Programming Approach to the Kernel Fisher Algorithm", Advances in Neural Information Processing Systems 13, pp. 591-597. *MIT Press*, 2001.

Mangasarian, "Generalized Support Vector Machines", Mathematical Programming Technical Report 98-14, Oct. 1998, http://www.cs.wisc.edu/~olvi/.

Lee et al, "RSVM: Reduced Support Vector Machines", Data Mining Institute Technical Report 00-07, Jul. 2000, CD Proceedings of the SIAM International Conference on Data Mining, Chicago, Apr. 5-7, 2001, SIAM, Philadelphia, ISBN 0-89871-495-8, http://www.cs.wisc.edu/~olvi/.

Mangasarian et al, "Multiple Instance Classification via Successive Linear Programming", Data Mining Institute Technical Report 05-02, May 2005, http://www.cs.wisc.edu/~olvi/.

Bezdek et al., "Some Notes on Alternating Optimization" N.R Pal and M. Sugeno (Eds.): AFSS 2002, LNAI 2275, pp. 289-300, 2002.

Fung et al., "Multiple Instance Learning for Computer Aided Diagnosis", Neural Information Processing Systems, Dec. 4, 2006.

Managasarian et al., "Multiple Instance Classification Via Successive Linear Programming", Data Mining Institute Technical Report 05-02, University of Wisconsin Madison, Feb. 2005, retrieved from the internet: URL:ftp://ftp.cs.wisc.edu/pub/dmi/tech-reports/05-02.pdf.

Fung et al., "Knowledge-Based Support Vector Machine Classifiers", Proceedings of International Conference on Neural Information Processing, 2002, pp. 1-8.

* cited by examiner

Table 1

| Algorithm | Time (PE) | Time (Colon) | AUC (PE) | AUC (Colon) | AUC-RCI (PE) | AUC-RCI (Colon) |
|---|---|---|---|---|---|---|
| IAPR | 184.6 | 689.0 | 0.83 | 0.70 | 0.34 | 0.26 |
| EMDD | 903.5 | 16614.0 | 0.67 | 0.80 | 0.17 | 0.42 |
| CH-FD | 97.2 | 7.9 | 0.86 | 0.90 | 0.50 | 0.69 |
| FD | 0.19 | 0.4 | 0.74 | 0.88 | 0.44 | 0.57 |

Figure 4

Table 2

| Datasets | MUSK1 | MUSK2 | Elephant | Tiger | Fox | Average Rank |
|---|---|---|---|---|---|---|
| CH-FD | 88.8 (2) | 85.7 (2) | 82.4 (2) | 82.2 (2) | 60.4 (2) | 2 |
| IAPR | 87.2 (5) | 83.6 (6) | - (-) | - (-) | - (-) | 5.5 |
| DD | 88.0 (3) | 84.0 (5) | - (-) | - (-) | - (-) | 4 |
| EMDD | 84.8 (6) | 84.9 (3) | 78.3 (5) | 72.1 (5) | 56.1 (5) | 4.8 |
| mi-SVM | 87.4 (4) | 83.6 (6) | 82.2 (3) | 78.4 (4) | 58.2 (3) | 4 |
| MI-SVM | 77.9 (8) | 84.3 (4) | 81.4 (4) | 84.0 (1) | 57.8 (4) | 4.2 |
| MI-NN | 88.9 (1) | 82.5 (7) | - (-) | - (-) | - (-) | 4 |
| MICA | 84.4 (7) | 90.5 (1) | 82.5 (1) | 82.0 (3) | 62.0 (1) | 3.25 |

SYSTEM AND METHOD FOR MULTIPLE INSTANCE LEARNING FOR COMPUTER AIDED DETECTION

CROSS REFERENCE TO RELATED UNITED STATES APPLICATIONS

This application claims priority from "Multiple Instance Learning Algorithms for Computer Aided Diagnosis", U.S. Provisional Application No. 60/765,922 of Dundar, et al., filed Feb. 7, 2006, the contents of which are herein incorporated by reference.

TECHNICAL FIELD

This invention is directed to learning algorithms for computer-aided detection (CAD) systems.

DISCUSSION OF THE RELATED ART

In computer-aided detection (CAD) applications, a goal is to identify structures of interest from medical images (CT scans, X-ray, MRI etc): potentially cancerous lesions, life-threatening blood clots, etc. Many CAD problems can be best modeled as a multiple-instance learning (MIL) problem with unbalanced data: the training data typically consists of a few positive bags, and a very large number of negative instances. This is done by generating candidates and building classifiers that label each candidate as positive (of interest to a physician) or negative (of no interest to the physician). In a typical CAD paradigm, this labelling is done independently for each candidate, according to a 3 stage system: identification of potentially unhealthy regions of interest (ROI) by a candidate generator, computation of descriptive features for each candidate, and labeling of each candidate (e.g. as normal or diseased) by a classifier. The training dataset for the classifier is generated as follows. Expert radiologists examine a set of images to mark out tumors. Then, candidate ROIs (with associated computed features) are marked positive if they are sufficiently close to a radiologist mark, and negative otherwise. Many CAD datasets have fewer than 1-10% positive candidates. Due to the process involved in the identification of potentially unhealthy candidates, the resulting data is highly correlated, which makes the use of many state-of-the-art classifiers inefficient.

In the CAD literature, standard machine learning algorithms, such as support vector machines (SVM), and Fisher's linear discriminant, have been employed to train the classifiers for the detection stage. However, almost all the standard methods for classifier design explicitly make certain assumptions that are violated by the somewhat special characteristics of the CAD data. In particular, most of the algorithms assume that the training samples or instances are drawn identically and independently from an underlying.

However, due to spatial adjacency of the regions identified by a candidate generator, both the features and the class labels of several adjacent candidates (training instances) are highly correlated. In particular, the data generation process gives rise to asymmetric and correlated labeling noise, wherein at least one of the positively labeled candidates is almost certainly positive (hence correctly labeled), although a subset of the candidates that refer to other structures that happen to be near the radiologist marks may be negative. First, because the candidate generators for CAD problems are trying to identify potentially suspicious regions, they tend to produce many candidates that are spatially close to each other; since these often refer to regions that are physically adjacent in an image, the class labels for these candidates are also highly correlated. Second, because candidates are labelled positive if they are within some pre-determined distance from a radiologist mark, multiple positive candidates could correspond with the same (positive) radiologist mark on the image. Note that some of the positively labelled candidates may actually refer to healthy structures that just happen to be near a mark, thereby introducing an asymmetric labeling error in the training data.

In MIL terminology, a "bag" may contain many observation instances of the same underlying entity, and every training bag is provided a class label (e.g. positive or negative). The objective in MIL is to learn a classifier that correctly classifies at least one instance from every bag. This corresponds to the appropriate measure of accuracy for evaluating the classifier in a CAD system. In particular, even if only one of the candidates that refers to the underlying malignant structure (radiologist mark) is correctly highlighted to the radiologist, the malignant structure is detected; i.e., the correct classification of every candidate instance is not as important as the ability to detect at least one candidate that points to a malignant region. Furthermore, it is desirable to classify every sample that is distant from radiologist mark as negative; this is easily accomplished by considering each negative candidate as a bag. Therefore, it would appear that MIL algorithms should outperform traditional classifiers on CAD datasets.

However, in practice, most of the conventional MIL algorithms are computationally quite inefficient, and some are challenged by local minima. In CAD one typically has several thousand mostly negative candidates (instances), and a few hundred positive bags, and existing MIL algorithms are simply unable to handle such large datasets due to time or memory requirements.

SUMMARY OF THE INVENTION

Exemplary embodiments of the invention as described herein generally include systems and methods for classification that take into account the characteristics of the CAD data. By leveraging the fact that many of the candidates are essentially the same structure of interest, the performance of a classifier can be improved. Rather than using each candidate by itself in the training, candidates that are spatially adjacent to each other are modeled by a "bag" and an artificial candidate is trained that best describes this bag as the classifier itself is trained. According to an embodiment of the invention, an approach to multiple-instance learning builds on an intuitive convex-relaxation of the original MIL problem improves the run time by replacing a large set of discrete constraints where at least one instance in each bag has to be correctly classified with an infinite but continuous sets of constraints where at least one convex combination of the original instances in every bag has to be correctly classified. Further, an algorithm of an embodiment of the invention for achieving convexity in the objective function of the training algorithm alleviates the challenges of local maxima that occurs in some of the previous MIL algorithms, and often improves the classification accuracy on many practical datasets. A practical implementation of an algorithm of an embodiment of the invention is presented in the form of a simple but efficient alternate-optimization algorithm for Convex Hull based Fisher's Discriminant. A CH framework applies to any standard hyperplane-based learning algorithm, and for some algorithms, is guaranteed to find the global optimal solution.

Experimental studies on two different CAD applications, one for detecting pulmonary embolisms in CT lung images, and the other one for detecting polyps in CT colonography, demonstrate that an algorithm of an embodiment of the invention significantly improves diagnostic accuracy when compared to both MIL and traditional classifiers. Although not designed for standard MIL problems, which have both positive and negative bags and relatively balanced datasets, comparisons against other MIL methods on benchmark problems also indicate that the proposed method is competitive with the state-of-the-art.

According to other embodiments of the invention, the same concept can be extended to improved classification of negative candidates, for example, by leveraging the fact that many negative candidates may represent the same structure of interest, such as stool in a colon CT, or lung tissue in a lung image.

According to an aspect of the invention, there is provided a method of training a classifier for computer aided detection of digitized medical images, including providing a plurality of bags, each bag containing a plurality of feature samples of a single region-of-interest in a medical image, wherein said features include texture, shape, intensity, and contrast of said region-of-interest, wherein each region-of-interest has been labeled as either malignant or healthy, and training a classifier on said plurality of bags of feature samples, subject to the constraint that at least one point in a convex hull of each bag, corresponding to a feature sample, is correctly classified according to the labeled of the associated region-of-interest.

According to a further aspect of the invention, the classifier is trained by solving a program equivalent to $$\min_{(\xi,\omega,\eta,\lambda) \in R^{r+n+1+\gamma}} vE(\xi) + \Phi(\omega,\eta) + \Psi(\lambda)$$

such that $$\xi^i = d^i(\lambda_j^i B_j^i \omega - e\eta)$$

$$\xi = \Omega$$

$$e'\lambda_j^i = 1$$

$$0 \leq \lambda_j^i$$

wherein $\xi = \{\xi_1, \ldots, \xi_r\}$ are slack terms (errors), $E:R^r \Rightarrow R$ represents a loss function, $\omega$ is a hyperplane coefficient, $\eta$ is the bias (offset from origin) term, $\lambda$ is a vector containing the coefficients of the convex combination that defines the representative point of bag i in class j wherein $0 \leq \lambda_j^i$, $e'\lambda_j^i=1$, $\gamma$ is the total number of convex hull coefficients corresponding to the representative points in class j, $\Phi:R^{(n+1)} \Rightarrow R$ is a regularization function on the hyperplane coefficients, $\Psi$ is a regularization function on the convex combination coefficients $\lambda_j^i$, matrix $B_j^i \in R^{m_j^i \times n}$, $i=1,\ldots,r_j$, $j \in \{\pm 1\}$ is the $i^{th}$ bag of class label j, r is the total number of representative points, n is the number of features, $m_j^i$ is the number of rows in B, vector $d \in \{\pm 1\}^r$ represents binary bag-labels for the malignant and healthy sets, respectively, and the vector e represent a vector with all its elements one.

According to a further aspect of the invention, $E(\xi) = \|(\xi)_+\|_2^2$, $\Phi(\omega,\eta) = \|(\omega,\eta)\|_2^2$ and $\Omega = R^{r+}$, wherein $\xi_+$ and $r_+$ are respectively slack variables and points labeled by +1.

According to a further aspect of the invention, $E(\xi) = \|(\xi)\|_2^2$, $\Phi(\omega,\eta) = \|(\omega,\eta)\|_2^2$ and $\Omega = R^r$.

According to a further aspect of the invention, $v=1$, $E(\xi) = \|\xi\|_2^2$ and $\Omega = \{\xi : e'\xi_j = 0, j \in \{\pm 1\}\}$.

According to a further aspect of the invention, the method comprises replacing $\xi^i$ by $d^i-(\lambda_j^i B_j^i \omega - e\eta)$ in the objective function, replacing equality constraints $e'\xi_j=0$ by $\omega'(\mu_+-\mu_-)=2$, wherein classifier is trained by solving a program equivalent to $$\min_{(\omega,\lambda) \in R^{n+\gamma}} \omega^T S_W \omega + \Phi(\omega) + \Psi(\lambda)$$

such that $$\omega^T(\mu_+ - \mu_-) = b$$

$$e'\lambda_j^i = 1$$

$$0 \leq \lambda_j^i$$

wherein $$S_W = \sum_{j \in \{\pm 1\}} \frac{1}{r_j}(X_j - \mu_j e')(X_j - \mu_j e')^T$$

is the within-class scatter matrix, $$\mu_j = \frac{1}{r_j} X_j e$$

is the mean for class j, $X_j \in R^{r_j \times n}$ is a matrix containing the $r_j$ representative points on an n-dimensional space such that the row of $X_j$ denoted by $b_j^i = B_j^i \lambda_j^i$ is the representative point of bag i in class j where $i = \{1, \ldots, r_j\}$, $j \in \{\pm 1\}$, and $\mu_+$ and $\mu_-$ are the mean values for the positive and negative labeled classes, respectively.

According to a further aspect of the invention, the method comprises initializing $$\lambda^{i0} = \frac{e}{m^i}, \forall i = 1, \ldots, r$$

and a counter $c=0$, for a fixed $\lambda^{ic}$, $\forall i=1,\ldots,r$, solving for $w^c$ in a system equivalent to $$\min_{(\omega,\lambda) \in R^{n+\gamma}} \omega^T S_W \omega + \Phi(\omega)$$

such that $$\omega^T(\mu_+ - \mu_-) = b,$$

for a fixed $\omega = \omega^c$, solving for $\lambda^{ic}$, $\forall i=1,\ldots,r$, in a system equivalent to $$\min_{(\omega,\lambda) \in R^{n+\gamma}} \lambda^T \overline{S}_W \lambda + \Psi(\lambda)$$

such that $$\lambda^T(\overline{\mu}_+ - \overline{\mu}_-) = b$$

$$e'\lambda_j^i = 1$$

$$0 \leq \lambda_j^i,$$

wherein $\overline{S}_w$ and $\overline{\mu}$ are defined with $X_j$ replaced by $\overline{X}_j$ wherein $\overline{X}_j \in R^{r_j \times \gamma}$ is a matrix containing $r_j$ new points on a $\gamma$-dimensional space wherein the row of $\overline{X}_j$ denoted by $\overline{b}_j^i$ is a vector with its nonzero elements set to $B_j^i \omega^c$ and if $\|\lambda^{1(c+1)} - \lambda^{1c}, \ldots, \lambda^{r(c+1)} - \lambda^{rc}\|_2$ is greater than a predefined tolerance, replacing $\lambda^{ic}$ by $\lambda^{i(c+1)}$ and c by c+1 and repeating the two previous steps.

According to a further aspect of the invention, the method comprises setting convex-hull coefficients of negative bags to be 1.

According to a further aspect of the invention, $\Phi(\omega)=\epsilon\|\omega\|_2^2$ and $\Psi(\lambda)=\epsilon\|\lambda\|_2^2$, where $\epsilon$ is a positive regularization parameter.

According to a further aspect of the invention, the method comprises transforming said feature samples into a higher dimensional space using a kernel transformation $(X\{+\}, X)$ for the positive class and $K(X\{-\}, X)$ for the negative class, wherein $X\{+\}$, $X\{-\}$, and X are data matrices for positive, negative and all samples respectively, wherein each row is a sample vector in these matrices, wherein if the size of X is too large, subsampling a random subset from said original feature samples.

According to another aspect of the invention, there is provided a method of training a classifier for computer aided detection of digitized medical images including providing a plurality of bags, each bag containing a plurality of feature samples of a single region-of-interest in a medical image, wherein each region-of-interest has been labeled as either malignant or healthy, wherein each bag is represented by a matrix $B_j^i \in R^{m_j \times n}$, $i=1,\ldots,r_j$, $j \in \{\pm 1\}$ is the $i^{th}$ bag of class label j, r is the total number of representative points, n is the number of features, $m_j^i$ is the number of rows in B, and solving a program equivalent to $$\min_{(\xi,\omega,\eta,\lambda) \in R^{r+n+1+\gamma}} \|\xi\|_2^2 + \Phi(\omega,\eta) + \Psi(\lambda)$$

such that $$\xi^i = d^i(\lambda_j^i B_j^i \omega - e\eta)$$

$$e'\xi_j = 0$$

$$e'\lambda_j^i = 1$$

$$0 \le \lambda_j^i$$

where $\xi = \{\xi_1, \ldots, \xi_r\}$ are slack terms, $\omega$ is a hyperplane coefficient, $\eta$ is the bias (offset from origin) term, $\lambda$ is a vector containing the coefficients of the convex combination that defines the representative point of bag i in class j wherein $0 \le \lambda_j^i$, $e'\lambda_j^i=1$, $\gamma$ is the total number of convex hull coefficients corresponding to the representative points in class j, $\Phi:R^{(n+1)} \Rightarrow R$ is a regularization function on the hyperplane coefficients, $\Psi$ is a regularization function on the convex combination coefficients $\lambda_j^i$, matrix $B_j^i \in R^{m_j \times n}$, $i=1,\ldots,r_j$, $j \in \{\pm 1\}$ is the $i^{th}$ bag of class label j, r is the total number of representative points, n is the number of features, $m_j^i$ is the number of rows in B, vector $d \in \{\pm 1\}^{r_j}$ represents binary bag-labels for the malignant and healthy sets, respectively, and the vector e represent a vector with all its elements one.

According to another aspect of the invention, there is provided a program storage device readable by a computer, tangibly embodying a program of instructions executable by the computer to perform the method steps for training a classifier for computer aided detection of digitized medical images.

BRIEF DESCRIPTION OF THE DRAWINGS

FIG. 4 is a table depicting accuracy on benchmark datasets, according to an embodiment of the invention.

DETAILED DESCRIPTION OF THE PREFERRED EMBODIMENTS

Figure 1:
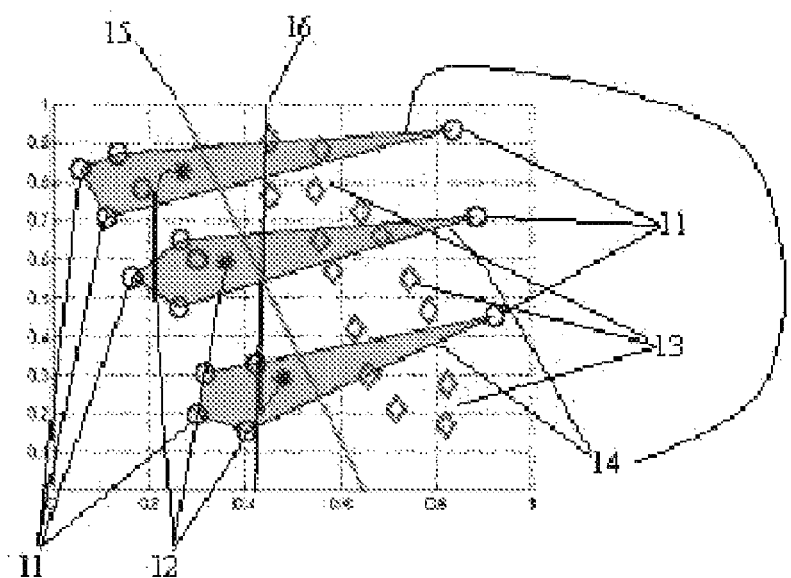
FIG. 1 depicts a simple example of convex hulls in MIL, according to an embodiment of the invention.

Exemplary embodiments of the invention as described herein generally include systems and methods for MIL in computer-aided detection (CAD). Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The following notation will be used herein below. Let the $i^{th}$ bag of class j be represented by the matrix $B_j^i \in R^{m_j \times n}$, $i=1,\ldots,r_j$, $j \in \{\pm 1\}$, where n is the number of features. The row l of $B_j^i$, denoted by $B_j^{il}$, represents the datapoint l of the bag i in class j with $l=1,\ldots,m_j^i$. The binary bag-labels are specified by a vector $d \in \{\pm 1\}^{r_j}$. The vector e represent a vector with all its elements one. Transposition is indicated by the prime symbol.

In the following description, it will be assumed that there are two classes, labeled as positive (+) and negative (−), where the positive label represents that sought after class. Typically, the sought after class represents malignant regions-of-interest.

The original MIL problem requires at least one of the samples in a bag to be correctly labeled by the classifier, which corresponds to a set of discrete constraints on the classifier. By contrast, according to an embodiment of the invention, this requirement shall be relaxed so that only at least one point in the convex hull of a bag of samples, including, possibly one of the original samples, should be correctly classified. The relaxed formulation corresponds to an infinite set of constraints, one for each point inside the convex hull, but these are easier to enforce because of their continuity. This relaxation also eliminates the combinatorial nature of the MIL technique, allowing algorithms that are more computationally efficient. As mentioned above, a bag $B_j^i$ will be considered correctly classified if any point inside the convex hull of the bag $B_j^i$ (i.e. any convex combination of points of $B_j^i$) is correctly classified.

Let $\lambda$ such that $0 \leq \lambda_j^i$, $e'\lambda_j^i = 1$ be the vector containing the coefficients of the convex combination that defines the representative point of bag i in class j. Let r be the total number of representative points, i.e. $r = r_+ + r_-$. Let $\gamma$ be the total number of convex hull coefficients corresponding to the representative points in class j, i.e.

$$\gamma_j = \sum_{i=1}^{r_j} m_j^i,$$

$$\gamma = \gamma_+ + \gamma_-.$$

Then, the MIL program can be formulated as, $$\min_{(\xi, \omega, \eta, \lambda) \in R^{r+n+1+\gamma}} vE(\xi) + \Phi(\omega, \eta) + \Psi(\lambda) \quad (1)$$

such that $$\xi^i = d^i - (\lambda_j^i B_j^i \omega - e\eta)$$

$$\xi \varepsilon \Omega$$

$$e'\lambda_j^i = 1$$

$$0 \leq \lambda_j^i$$

where $\xi = \{\xi_1, \ldots, \xi_r\}$ are slack terms (errors), $\omega$ are hyperplane coefficients, $\eta$ is the bias (offset from origin) term, and $\lambda$ is a vector containing all the $\lambda_j^i$ for $i = 1, \ldots, r_j$, $j \in \{\pm 1\}$. $E: R^r \Rightarrow R$ represents the loss function, $\Phi: R^{(n+1)} \Rightarrow R$ is a regularization function on the hyperplane coefficients, $\Psi$ is a regularization function on the convex combination coefficients $\lambda_j^i$, and $\Omega$ represents the feasible set for $\xi$. Depending on the choice of E, $\Phi$, $\Psi$ and $\Omega$, EQ. (1) will lead to MIL versions of several well-known classification algorithms.

1. $E(\xi) = \|(\xi)_+\|_2^2$, $\Phi(\omega, \eta) = \|(\omega, \eta)\|_2^2$ and $\Omega = R^{r+}$, leads to MIL versions of the Quadratic-Programming-SVM.

2. $E(\xi) = \|(\xi)\|_2^2$, $\Phi(\omega, \eta) = \|(\omega, \eta)\|_2^2$ and $\Omega = R^r$, leads to MIL versions of the Least-Squares-SVM.

3. $v = 1$, $E(\xi) = \|\xi\|_2^2$, $\Omega = \{\xi: e'\xi_j = 0, j \in \{\pm 1\}\}$ leads to MIL versions of the Quadratic-Programming (QP) formulation for Fisher's linear discriminant (FD).

FIG. 1 depicts a simple example of convex hulls in MIL, according to an embodiment of the invention. Positive and negative classes are represented by circles 11 and diamonds 13 respectively. The polyhedrons 14 represent the convex hulls for the three positives bags, the points chosen by an algorithm of an embodiment of the invention to represent each bag are shown by stars 12. The grey line 15 represents the linear hyperplane obtained by the algorithm and the black line 16 represents the hyperplane for an SVM.

According to a non-limiting embodiment of the invention, an example is derived for the Fisher's Discriminant (FD), because this choice has some algorithmic as well as computational utility.

Setting $v = 1$, $E(\xi) = \|\xi\|_2^2$, $\Omega = \{\xi: e'\xi_j = 0, j \in \{\pm 1\}\}$ in EQ. (1) the following MIL version of the quadratic programming algorithm for Fisher's Linear Discriminant is obtained:

$$\min_{(\xi, \omega, \eta, \lambda) \in R^{r+n+1+\gamma}} \|\xi\|_2^2 + \Phi(\omega, \eta) + \Psi(\lambda) \quad (2)$$

such that $\xi^i = d^i - (\lambda_j^i B_j^i \omega - e\eta)$ $$e'\xi_j = 0$$

$$e'\lambda_j^i = 1$$

$$0 \leq \lambda_j^i$$

The number of variables to be optimized in EQ. (2) is $r+n+1+\gamma$, which is computationally infeasible when the number of bags is large ($r > 10^4$). To alleviate the situation, one can (1) replace $\xi^i$ by $d^i - (\lambda_j^i B_j^i \omega - e\eta)$ in the objective function, and (2) replace the equality constraints $e'\xi_j = 0$ by $\omega'(\mu_+ - \mu_-) = 2$, where $\mu_+$ and $\mu_-$ are mean values for the positive labeled and negative labeled classes, respectively. This substitution eliminates the variables $\xi$, $\eta$ from the program and also the corresponding r equality constraints in EQ. (2). Effectively, this results in the MIL version of the traditional FD algorithm. As discussed herein below, in addition to the computational gains, this manipulation has some algorithmic uses as well. Thus, the optimization program reduces to:

$$\min_{(\omega, \lambda) \in R^{n+\gamma}} \omega^T S_W \omega + \Phi(\omega) + \Psi(\lambda) \quad (3)$$

such that $\omega^T (\mu_+ - \mu_-) = b$ $$e'\lambda_j^i = 1$$

$$0 \leq \lambda_j^i$$

where $$S_W = \sum_{j \in \{\pm 1\}} \frac{1}{r_j} (X_j - \mu_j e')(X_j - \mu_j e')^T$$

is the within-class scatter matrix, $$\mu_j = \frac{1}{r_j} X_j e$$

is the mean for class j. $X_j \in R^{r_j \times n}$ is a matrix containing the $r_j$ representative points on an n-dimensional space such that the row of Xj denoted by $b_j^i = B_j^i \lambda_j^i$ is the representative point of bag i in class j where $i = \{1, \ldots, r_j\}$ and $j \in \{\pm 1\}$.

According to another embodiment of the invention, the mathematical program represented by EQ. (3) can be solved with an efficient Alternate Optimization (AO) algorithm. According to this embodiment of the invention, the main optimization is subdivided into two smaller subprograms that depend on disjoint subsets of the original variables. When $\Phi(\omega)$ and $\Psi(\lambda)$ are strongly convex functions, both the original objective function and the two subprograms (for optimizing $\lambda$ and $\omega$) in EQ. (3) are strongly convex, meaning that the algorithm converges to a global minimizer. For computational efficiency, the regularizers $\Phi(\omega) = \epsilon \|\omega\|_2^2$ and $\Psi(\lambda) = \epsilon \|\lambda\|_2^2$, will be used herein below, where $\epsilon$ is a positive regularization parameter. Embodiments of an efficient AO algorithm for the mathematical program of EQ. (3) are described below.

Sub Program 1: When $\lambda=\lambda^*$ is fixed, the program becomes, $$\min_{(\omega,\lambda)\in R^{n+\gamma}} \omega^T S_W \omega + \Phi(\omega) \quad (4)$$

$$\text{such that } \omega^T(\mu_+ - \mu_-) = b$$

which is the formulation for the Fisher's Discriminant. Since $S_W$ is the sum of two covariance matrices, it is guaranteed to be at least positive semidefinite and thus the program in EQ. (4) is convex. For datasets with r>>n, i.e. the number of bags is much greater than the number of dimensions, $S_W$ is positive definite and thus the program in EQ. (4) is strictly convex. Unlike EQ. (1), where the number of constraints is proportional to the number of bags, eliminating $\xi$ and $\eta$ leaves only one constraint. This changes the order of complexity from $O(nr^2)$ to $O(n^2r)$ and brings some computational advantages when dealing with datasets with r>>n.

Sub Program 2: When $\omega=\omega^*$ is fixed, the program becomes $$\min_{(\omega,\lambda)\in R^{n+\gamma}} \lambda^T \overline{S}_W \lambda + \Psi(\lambda) \quad (5)$$

$$\text{such that } \lambda^T(\overline{\mu}_+ - \overline{\mu}_-) = b$$

$$e'\lambda_j^i = 1$$

$$0 \leq \lambda_j^i$$

where $\overline{S}_W$ and $\overline{\mu}$ are defined as in EQ. (4) with Xj replaced by $\overline{X}_j$ where $\overline{X}_j \in R^{r_j \times \gamma}$ is now a matrix containing the $r_j$ new points on the γ-dimensional space such that the row of $\overline{X}_j$ denoted by $\overline{b}_j^i$ is a vector with its nonzero elements set to $B_j^i \omega^*$. For the positive class, elements $\Sigma_{k=1}^{i-1} m_+^k + 1$ through $\Sigma_{k=1}^{i} m_+^k$ of $\overline{b}_j^i$ are nonzero, for the negative class, nonzero elements are located at $\Sigma_{k=1}^{r} m_+^k + \Sigma_{k=1}^{i-1} m_-^k + 1$ through $\Sigma_{k=1}^{r} m_+^k + \Sigma_{k=1}^{i} m_-^k$. Note that $\overline{S}_W$ is also a sum of two covariance matrices and positive semidefinite, and thus the program in EQ. (5) is convex. Unlike subprogram 1 the positive definiteness of $\overline{S}_W$ does not depend on the data, since it always true that $r \leq \gamma$. The complexity of EQ. (5) is $O(n\gamma^2)$.

As was mentioned above, in CAD applications, a bag is defined as a set of candidates that are spatially close to the radiologist marked ground-truth. Any candidate that is spatially far from this location is considered negative in the training data, therefore the concept of bag for negative examples does not make any practical sense in this scenario. Moreover, since ground truth is only available on the training set, there is no concept of a bag on the test set for both positive and negative examples. The learned classifier labels (i.e. classifies) individual instances, that is, the bag information for positive examples is only used to help learn a better classifier from the training data. Hence, the program in EQ. (5) can be simplified by solving it for the convex hull of positive coefficients only (the negative bags are assumed to be one) to account for these practical observations. Removing the constant terms yields $$\min_{\lambda_+ \in R^{\gamma_+}} \|\lambda_+^T(\overline{X}_+ - \overline{\mu}_+ e')\|_2^2 \quad (6)$$

$$\text{such that } \lambda^T \overline{\mu}_+ = b + \mu_-^T \omega^*$$

$$e'\lambda_j^i = 1$$

$$0 \leq \lambda_j^i$$

an optimization program with $O(n\lambda_+^2)$ complexity.

An algorithm for learning convex hull representation of multiple instances according to an embodiment of the invention is summarized below for clarity.

(0) Choose as initial guess for $$\lambda^{i0} = \frac{e}{m^i}, \forall i = 1, \ldots, r;$$

set counter c=0.

(1) For fixed $\lambda^{ic}, \forall i=1, \ldots, r$, solve for $w^c$ in EQ. (4).

(2) Fixing $w=w^C$ solve for $\lambda^{ic}, \forall i=1, \ldots, r$, in EQ. (5).

(3) Stop if $\|\lambda^{1(c+1)} - \lambda^{1c}, \ldots, \lambda^{r(c+1)} - \lambda^{rc}\|_2$ is less than some desired tolerance, Otherwise replace $\lambda^{ic}$ by $\lambda^{i(c+1)}$ and c by c+1 and go to step (1).

The objective functions of the subprograms in EQS. (4) and (5) are both convex on ω and λ, respectively. Thus, the above algorithm of an embodiment of the invention is guaranteed to converge to a unique minimizer. Note also that EQ. (6) can be substituted for EQ. (5) in step (2).

A nonlinear version of an algorithm according to an embodiment of the invention can be obtained by first transforming the original datapoints to a kernel space spanned by all datapoints through a kernel operator, such as $K:R^n \Rightarrow R^{\overline{\gamma}}$, and then optimizing EQS. (4) and (5) in this new space. Ideally $\overline{\gamma}$ is set to γ. Eqs (4) and (5) take the same forms. The application of the kernel operator is a preprocessing step. Before feeding the data to the training phase it is nonlinearly transformed into a higher dimensional space after which the data is used in EQS. (4) and (5). The kernel transformation is $K(X\{+\}, X)$ for the positive class and $K(X\{-\}, X)$ for the negative class, where $X\{+\}, X\{-\}$, and X are data matrices for positive, negative and all samples respectively. Each row is a sample vector in these matrices, so if the size of X is too large, meaning there are too many training samples, then a random subset can be subsampled from the original set. This corresponds to constraining ω to lie in a subspace of the kernel space.

Experiments comparing an algorithm of an embodiment of the invention to other known techniques using real and benchmark data sets. One set of experiments compared four techniques: a naive Fisher's Discriminant (FD), a convex-hull FD (CH-FD) according to an embodiment of the invention, an Expectation-Maximization Diverse-Density (EM-DD) technique, and an Iterated Discriminant axis-parallelogram rectangle (IDAPR) technique. In both experiments a linear embodiment of an algorithm of the invention was used. Hence the only parameter that required tuning is v which is tuned to optimize the 10-fold Patient Cross Validation on the training data. All algorithms are trained on the training data and then tested on the sequestered test data. The resulting Receiver Operating Characteristics (ROC) plots are obtained by trying different values of the IDAPR parameters, and by thresholding the corresponding output for each of the EM-DD, FD and CH-FD techniques.

One set of data concerned pulmonary embolism (PE), a potentially life-threatening condition that is a result of underlying venous thromboembolic disease. An early and accurate detection is the key to survival. Computed tomography angiography (CTA) has emerged as an accurate diagnostic tool for PE. However, there are hundreds of CT slices in each CTA study and manual reading is laborious, time consuming and complicated by various PE lookalikes. Data from four different hospitals (two North American sites and two European sites) was collected including 72 cases with 242 PE bags comprised of 1069 positive candidates marked by expert chest radiologists. The cases were randomly divided into two sets: a training set with 48 cases with 173 PE bags and 3655 candidates, and a testing set with 24 cases with 69 PE bags and 1857 candidates. The test group was sequestered and only used to evaluate the performance of the final system. A combined total of 70 features are extracted for each candidate.

Another set of data concerned colorectal cancer, the third most common cancer in both men and women. It is estimated that in 2004, nearly 147,000 cases of colon and rectal cancer will be diagnosed in the United States, and more than 56,730 people would die from colon cancer. CT colonography is emerging as a new procedure to help in early detection of colon polyps. Again, however, reading through a large CT dataset, which typically consists of two CT series of the patient in prone and supine positions, each with several hundred slices, is time-consuming. Colon CAD can play a critical role to help the radiologist avoid the missing of colon polyps. Most polyps, therefore, are represented by two candidates; one obtained from the prone view and the other one from the supine view. Moreover, for large polyps, a typical candidate generation algorithm generates several candidates across the polyp surface. The database of high-resolution CT images used in this study was obtained from seven different sites across the Unites States, Europe and Asia. The 188 patients were randomly partitioned into two groups: a training group comprised of 65 cases with 127 volumes, 50 polyps bags with 179 positive candidates were identified in this set with a total number of 6569 negative candidates; and a test group comprised of 123 patients with 237 volumes, a total of 103 polyp bags with 232 positive candidates were identified in this set with a total number of 12752 negative candidates. The test group was sequestered and only used to evaluate the performance of the final system. A total of 75 features are extracted for each candidate.

Figures 2, 3:
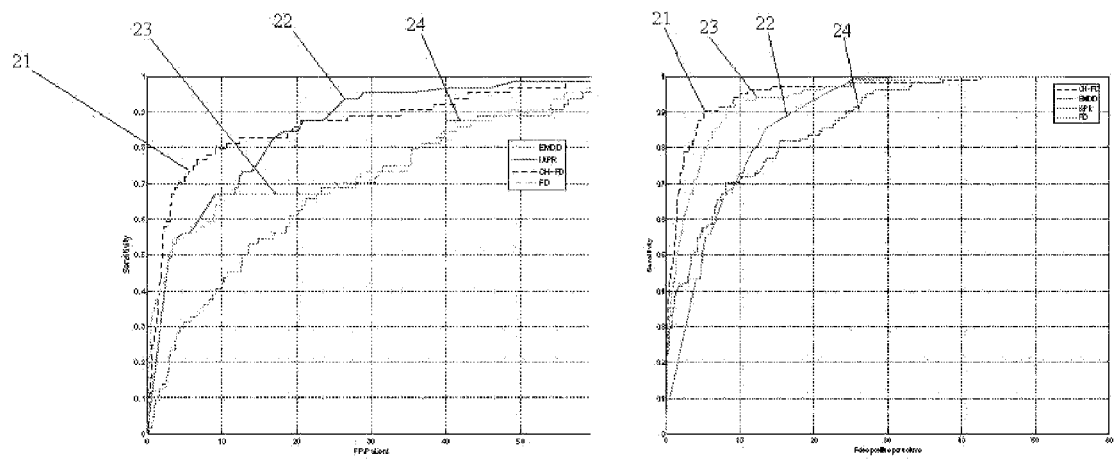
FIG. 2 is a graph of the ROC curves for two test examples, according to an embodiment of the invention.
FIG. 3 is a table comparing three MIL and one traditional algorithms, according to an embodiment of the invention.

The resulting Receiver Operating Characteristics (ROC) curves are displayed in FIG. 2, with PE Testing data on the left and colon testing Data on the right. In each sub-figure, curve 21 is a plot of the CH-FD data, curve 22 is a plot of the IDAPR data, curve 23 is a plot of the FD data, and curve 24 is a plot of the EM-DD data. Table 1, shown in FIG. 3, displays comparison data of 3 MIL and one traditional algorithms: Computation time, area-under-curve (AUC), and normalized AUC in the region of clinical interest (AUC-RCI) for PE and Colon test data. Although the ROC for the PE dataset IDAPR crosses over CH-FD ROC and is more sensitive than CH-FD for extremely high number of false positives, the AUC data in Table 1 shows that CH-FD is more accurate than all other methods over the entire space. Note that CAD performance is only valid in the clinically acceptable range: <10 fp/patient for PE, <5 fp/volume for colon (generally there are 2 volumes per patient). In the region of clinical interest (AUC-RCI), Table 1 shows that CH-FD significantly outperforms all other methods. In addition, it is noted that as the distance between candidate ROI increases, the correlations between their features and labels decreases.

Execution times for all the methods tested are shown in Table 1. As expected, the computational cost is the cheapest for the traditional non-MIL based FD. Referring to the table, among MIL algorithms, for the PE data, a CH-FD according to an embodiment of the invention was roughly 2-times and 9-times as fast than IDAPR and EM-DD respectively, and for the much larger colon dataset was roughly 85-times and 2000-times faster, respectively.

A CH-FD according to an embodiment of the invention was also compared with several state-of-the-art MIL algorithms on 5 benchmark MIL datasets: 2 Musk datasets and 3 Image Annotation datasets. Each of these datasets contain both positive and negative bags. CH-FD and MICA (multiple instance classification algorithm) use just the positive bag information and ignore the negative bag information, in effect, treating each negative instance as a separate bag. All the other MIL algorithms use both the positive and negative bag information.

The Musk datasets contains feature vectors describing the surfaces of low-energy shapes from molecules. Each feature vector has 166 features. The goal is to differentiate molecules that smell "musky" from the rest of the molecules. Approximately half of the molecules are known to smell musky. There are two musk datasets: MUSK1, which contains 92 molecules with a total of 476 instances; and (2) MUSK2, which contains 102 molecules with a total of 6598 instances. 72 of the molecules are shared between two datasets but MUSK2 dataset contain more instances for the shared molecules.

The Image Annotation data is composed of three different categories, namely Tiger, Elephant, Fox. Each dataset has 100 positive bags and 100 negative bags.

The function $\Phi(\omega)$ is set $\Phi(\omega)=v|\lambda|$. For the musk datasets the results are based on a Radial Basis Function (RBF) kernel $K(x_i, x_j)=\exp(-\sigma\|x-y\|^2)$. The kernel space is assumed to be spanned by all the datapoints in MUSK1 dataset and a subset of the datapoints in MUSK2 dataset, and one tenth of the original training set is randomly selected for this purpose. The width of the kernel function and v are tuned over a discrete set of five values each to optimize the 10-fold Cross Validation performance. For the Image Annotation data, a linear embodiment of an algorithm of the invention was used. The benchmark experiment design was followed and an average accuracy of 10 runs of 10-fold Cross Validation was reported in Table 2, shown in FIG. 4. Results for other MIL algorithms are also reported in the same table. Iterated Discriminant APR (IAPR), Diverse Density (DD), Expectation-Maximization Diverse Density (EM-DD), Maximum Bag Margin Formulation of SVM (mi-SVM, MI-SVM), Multi Instance Neural Networks (MI-NN) are the techniques considered in this experiment for comparison purposes.

Table 2 displays the average accuracy on the Benchmark Datasets. The number in parenthesis represents the relative rank of each of the algorithms (performance-wise) in the corresponding dataset. Table 2 shows that a CH-FD algorithm according to an embodiment of the invention is comparable to other techniques on all datasets, even though it ignores the negative bag information. Furthermore, CH-FD appears to be the most stable of the algorithms, at least on these 5 datasets, achieving the most consistent performance as indicated by the "Average Rank" column. This stable behavior of an algorithm of an embodiment of the invention may be due in part because it converges to global solutions avoiding the local minima problem. An algorithm according to an embodiment of the invention leads to a strongly convex minimization problem that converges to a unique minimizer. Since an algorithm of an embodiment of the invention considers each negative instance as an individual bag, its complexity is square proportional to the number of positive instances, which makes it scalable to large datasets with large number of negative examples.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
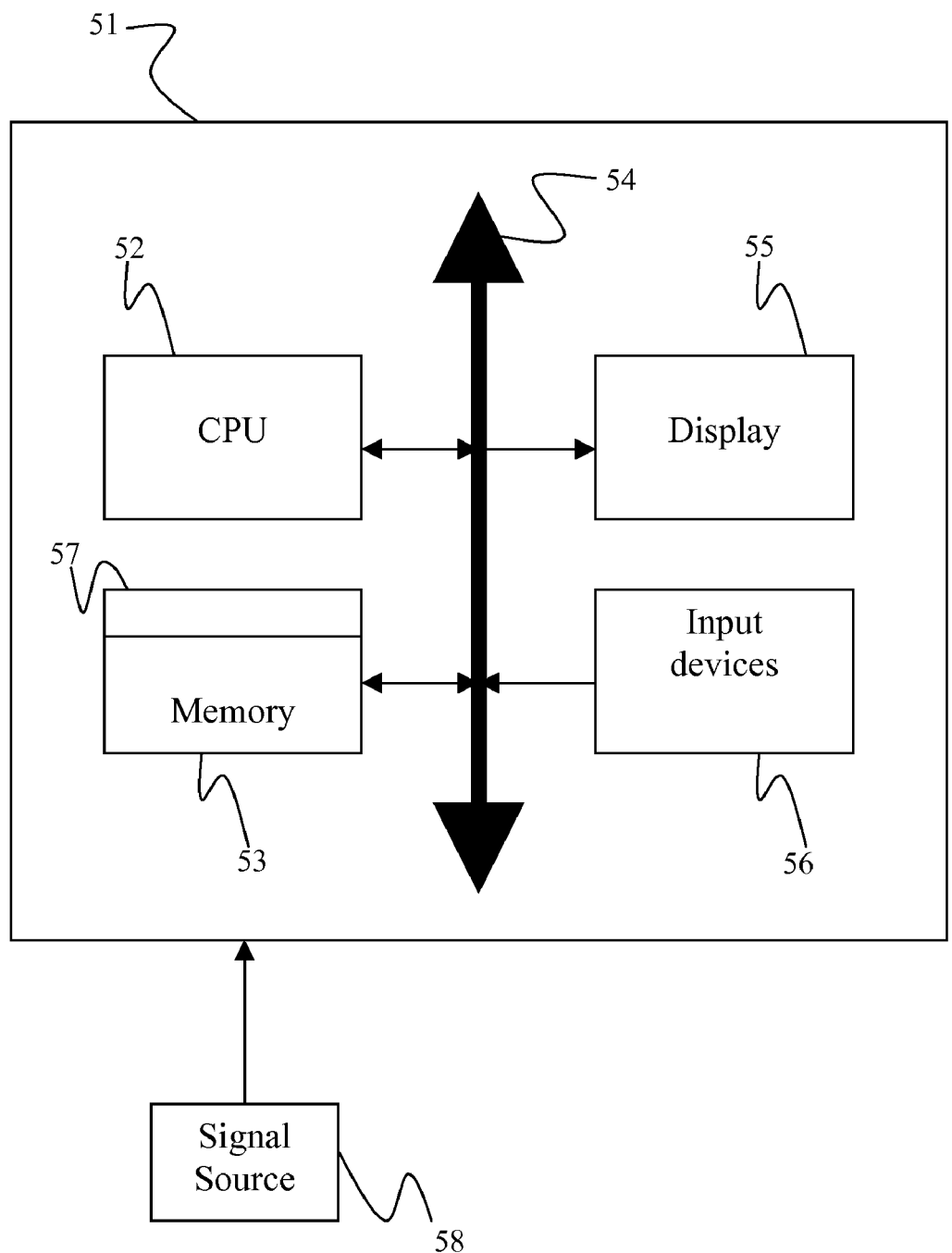
FIG. 5 is a block diagram of an exemplary computer system for implementing a MIL algorithm for CAD, according to an embodiment of the invention.

FIG. 5 is a block diagram of an exemplary computer system for implementing a MIL algorithm for CAD, according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method of training a classifier for computer aided detection of digitized medical images, comprising the steps of:

providing a plurality of bags, each bag containing a plurality of feature samples of a single region-of-interest in said medical image, wherein said feature samples include texture, shape, intensity, and contrast of said region-of-interest, wherein each region-of-interest has been labeled as either malignant or healthy; and training said classifier on said plurality of bags of feature samples, subject to the constraint that at least one point in a convex hull of each bag, corresponding to said feature sample, is correctly classified according to the label of the associated region-of-interest, wherein said classifier is trained on a computer, and wherein said classifier is trained by minimizing the expression $vE(\xi)+\Phi(\omega,\eta)+\Psi(\lambda)$ over arguments $(\xi,\omega,\eta,\lambda) \in R^{r+n+1+\gamma}$ subject to the conditions $$\xi^i = d^i - (\lambda_j^i B_j^i \omega - e\eta),$$

$$\xi \in \Omega,$$

$$e'\lambda_j^i = 1,$$

$$0 \leq \lambda_j^i,$$

wherein $\xi = \{\xi_1, \ldots, \xi_r\}$ are slack terms, $E: R^r \Rightarrow R$ represents a loss function, $\omega$ is a hyperplane coefficient, $\eta$ is the bias term, $\lambda$ is a vector containing the coefficients of the convex combination that defines the representative point of bag i in class j wherein $0 \leq \lambda_j^i, e'\lambda_j^i = 1$, $\gamma$ is the total number of convex hull coefficients corresponding to the representative points in class j, $\Phi: R^{(n+1)} \Rightarrow R$ is a regularization function on the hyperplane coefficients, $\Psi$ is a regularization function on the convex combination coefficients $\lambda_j^i$, $\Omega$ represents a feasible set for $\xi$ matrix $B_j^i \in R^{m_j^i \times n}, i=1, \ldots, r_j, j \in \{\pm 1\}$ is the $i^{th}$ bag of class label j, r is the total number of representative points, n is the number of features, $m_j^i$ is the number of rows in B, vector $d \in \{\pm 1\}^{r_j}$ represents binary bag-labels for the malignant and healthy sets, respectively, and the vector e represents a vector with all its elements equal to one.

2. The method of claim 1, wherein $E(\xi) = \|(\xi)_+\|_2^2$, $\Phi(\omega,\eta) = \|(\omega,\eta)\|_2^2$ and $\Omega = R^{r_+}$, wherein $\xi_+$ and $r_+$ are respectively slack variables and points labeled by +1.

3. The method of claim 1, wherein $E(\xi) = \|(\xi)\|_2^2, \Phi(\omega,\eta) = \|(\omega,\eta)\|_2^2$ and $\Omega = R^r$.

4. The method of claim 1, wherein $v=1, E(\xi) = \|\xi\|_2^2$ and $\Omega = \{\xi : e'\xi_j = 0, j \in \{\pm 1\}\}$.

5. The method of claim 4, further comprising replacing $\xi^i$ by $d^i - (\lambda_j^i B_j^i \omega - e\eta)$ in the objective function, replacing equality constraints $e'\xi_j = 0$ by $\omega'(\mu_+ - \mu_-) = 2$, wherein said classifier is trained by minimizing the expression $\omega^T S_W \omega + \Phi(\omega) + \Psi(\lambda)$ with respect to the arguments $(\omega,\lambda) \in R^{n+\gamma}$ subject to the conditions $$\omega^T(\mu_+ - \mu_-) = b,$$

$$e'\lambda_j^i = 1,$$

$$0 \leq \lambda_j^i,$$

wherein $$S_W = \sum_{j \in \{\pm 1\}} \frac{1}{r_j} (X_j - \mu_j e')(X_j - \mu_j e')^T$$

is the within-class scatter matrix, $$\mu_j = \frac{1}{r_j} X_j e$$

is the mean for class j, $X_j \in R^{r_j \times n}$ is a matrix containing the $r_j$ representative points on an n-dimensional space such that the row of $X_j$ denoted by $b_j^i = B_j^i \lambda_j^i$ is the representative point of bag i in class j where $i = \{1, \ldots, r_j\}, j \in \{\pm 1\}$, and $\mu_+$ and $\mu_-$ are the mean values for the positive and negative labeled classes, respectively.

6. The method of claim 5, further comprising:
   initializing $$\lambda^{i0} = \frac{e}{m^i}, \forall\, i=1,\ldots,r$$

and a counter c=0,
   for a fixed $\lambda^{ic}, \forall i=1,\ldots,r$, minimizing the expression $\omega^T S_W \omega + \Phi(\omega)$ to solve for $w^c$
   subject to the condition that $\omega^T(\mu_+ - \mu_-) = b$;
   for a fixed $\omega = \omega^c$, minimizing the expression $\lambda^T \overline{S}_W \lambda + \Psi(\lambda)$ to solve for $\lambda^{ic}$, $\forall i=1,\ldots,r$,
   subject to the condition that $\lambda^T(\overline{\mu}_+ - \overline{\mu}_-) = b$, $e^t \lambda_j^i = 1$, $0 \le \lambda_j^i$, wherein $\overline{S}_W$ and $\overline{\mu}$ are defined with $X_j$ replaced by $\overline{X}_j$ wherein $\overline{X}_j \in R^{r_j \times \gamma}$ is a matrix containing $r_j$ new points on a $\gamma$-dimensional space wherein the row of $\overline{X}_j$ denoted by $\overline{b}_j^i$ is a vector with its nonzero elements set to $B_j^i \omega^c$; and
   if $\|\lambda^{1(c+1)} - \lambda^{1c}, \ldots, \lambda^{r(c+1)} - \lambda^{rc}\|_2$ is greater than a predefined tolerance, replacing $\lambda^{ic}$ by $\lambda^{i(c+1)}$ and c by c+1 and repeating the two previous steps.

7. The method of claim 6, further comprising setting convex-hull coefficients of negative bags to be 1.

8. The method of claim 6, further comprising transforming said feature samples into a higher dimensional space using a kernel transformation $(X\{+\}, X)$ for the positive class and $K(X\{-\}, X)$ for the negative class, wherein $X\{+\}$, $X\{-\}$, and $X$ are data matrices for positive, negative and all samples respectively, wherein each row is a sample vector in these matrices, wherein if the size of X is too large, subsampling a random subset from said original feature samples.

9. The method of claim 5, wherein $\Phi(\omega) = \epsilon \|\omega\|_2^2$ and $\Psi(\lambda) = \epsilon \|\lambda\|_2^2$, wherein $\epsilon$ is a positive regularization parameter.

10. A method of training a classifier for computer aided detection of digitized medical images, comprising the steps of:
   providing a plurality of bags, each bag containing a plurality of feature samples of a single region-of-interest in said medical image, wherein each region-of-interest has been labeled as either malignant or healthy, wherein each bag is represented by a matrix $B_j^i \in R^{m_j^i \times n}$, $i=1,\ldots,r_j, j \in \{\pm 1\}$ is the $i^{th}$ bag of class label j, r is the total number of representative points, n is the number of features, $m_j^i$ is the number of rows in B; and
   training said classifier by minimizing the expression $\|\xi\|_2^2 + \Phi(\omega,\eta) + \Psi(\lambda)$ over arguments $(\xi,\omega,\eta,\lambda) \in R^{r+n+1+\gamma}$ subject to the conditions $\xi^i = d^i - (\lambda_j^i B_j^i \omega - e\eta)$, $e^t \xi_j = 0$, $e^t \lambda_j^i = 1$, $0 \le \lambda_j^i$, wherein $\xi = \{\xi_1, \ldots, \xi_r\}$ are slack terms, $\omega$ is a hyperplane coefficient, $\eta$ is the bias offset from the origin term, $\lambda$ is a vector containing the coefficients of the convex combination that defines the representative point of bag i in class j wherein $0 \le \lambda_j^i, e^t \lambda_j^i = 1$, $\gamma$ is the total number of convex hull coefficients corresponding to the representative points in class j, $\Phi:R^{(n+1)} \Rightarrow R$ is a regularization function on the hyperplane coefficients, $\Psi$ is a regularization function on the convex combination coefficients $\lambda_j^i$, matrix $B_j^i \in R^{m_j^i \times n}, i=1,\ldots,r_j$, $j \in \{\pm 1\}$ is the $i^{th}$ bag of class label j, r is the total number of representative points, n is the number of features, $m_j^i$ is the number of rows in B, vector $d \in \{\pm 1\}^{r_j}$ represents binary bag-labels for the malignant and healthy sets, respectively, and the vector e represents a vector with all its elements equal to one.

11. A program storage device readable by a computer, tangibly embodying a non-transitory program of instructions executable by the computer to perform the method steps for training a classifier for computer aided detection of digitized medical images, said method comprising the steps of:
   providing a plurality of bags, each bag containing a plurality of feature samples of a single region-of-interest in said medical image, wherein said feature samples include texture, shape, intensity, and contrast of said region-of-interest, wherein each region-of-interest has been labeled as either malignant or healthy; and
   training said classifier on said plurality of bags of feature samples, subject to the constraint that at least one point in a convex hull of each bag, corresponding to said feature sample, is correctly classified according to the label of the associated region-of-interest
   wherein said classifier is trained by minimizing the expression $vE(\xi) + \Phi(\omega,\eta) + \Psi(\lambda)$ over arguments $(\xi,\omega,\eta,\lambda) \in R^{r+n+1+\gamma}$
   subject to the conditions $\xi^i = d^i - (\lambda_j^i B_j^i \omega - e\eta)$, $\xi \in \Omega$, $e^t \lambda_j^i = 1$, $0 \le \lambda_j^i$, wherein $\xi = \{\xi_1, \ldots, \xi_r\}$ are slack terms, $E:R^r \Rightarrow R$ represents a loss function, $\omega$ is a hyperplane coefficient, $\eta$ is the bias term, $\lambda$ is a vector containing the coefficients of the convex combination that defines the representative point of bag i in class j wherein $0 \le \lambda_j^i, e^t \lambda_j^i = 1$, $\gamma$ is the total number of convex hull coefficients corresponding to the representative points in class j, $\Phi:R^{(n+1)} \Rightarrow R$ is a regularization function on the hyperplane coefficients, $\Psi$ is a regularization function on the convex combination coefficients $\lambda_j^i$, $\Omega$ represents a feasible set for $\xi$, matrix $B_j^i \in R^{m_j^i}, i=1,\ldots,r_j, j \in \{\pm 1\}$ is the $i^{th}$ bag of class label j, r is the total number of representative points, n is the number of features, $m_j^i$ is the number of rows in B, vector $d \in \{\pm 1\}^{r_j}$ represents binary bag-labels for the malignant and healthy sets, respectively, and the vector e represents a vector with all its elements equal to one.

12. The computer readable program storage device of claim 11, wherein $E(\xi) = \|(\xi)_+\|_2^2, \Phi(\omega,\eta) = \|(\omega,\eta)\|_2^2$ and $\Omega = R^{r_+}$, wherein $\xi_+$ and $r_+$ are respectively slack variables and points labeled by +1.

13. The computer readable program storage device of claim 11, wherein $E(\xi) = \|(\xi)\|_2^2, \Phi(\omega,\eta) = \|(\omega,\eta)\|_2^2$ and $\Omega = R^r$.

14. The computer readable program storage device of claim 11, wherein $v=1$, $E(\xi) = \|\xi\|_2^2$ and $\Omega = \{\xi: e^t \xi_j = 0, j \in \{\pm 1\}\}$.

15. The computer readable program storage device of claim 14, the method further comprising replacing $\xi^i$ by $d^i - (\lambda_j^i B_j^i \omega - e\eta)$ in the objective function, replacing equality constraints $e'\xi_j = 0$ by $\omega'(\mu_+ - \mu_-) = 2$, wherein said classifier is trained by minimizing the expression $\omega^T S_W \omega + \Phi(\omega) + \Psi(\lambda)$ with respect to the arguments $(\omega, \lambda) \in R^{n+\gamma}$ subject to the conditions $$\omega^T(\mu_+ - \mu_-) = b,$$

$$e'\lambda_j^i = 1,$$

$$0 \leq \lambda_j^i,$$

wherein $$S_W = \sum_{j \in \{\pm 1\}} \frac{1}{r_j}(X_j - \mu_j e')(X_j - \mu_j e')^T$$

is the within-class scatter matrix, $$\mu_j = \frac{1}{r_j} X_j e$$

is the mean for class j, $X_j \in R^{r_j \times n}$ is a matrix containing the $r_j$ representative points on an n-dimensional space such that the row of $X_j$ denoted by $b_j^i = B_j^i \lambda_j^i$ is the representative point of bag i in class j where $i = \{1, \ldots, r_j\}$, $j \in \{\pm 1\}$, and $\mu_+$ and $\mu_-$ are the mean values for the positive and negative labeled classes, respectively.

16. The computer readable program storage device of claim 15, the method further comprising:
initializing $$\lambda^{i0} = \frac{e}{m^i}, \forall i = 1, \ldots, r$$

and a counter c=0,
for a fixed $\lambda^{ic}, \forall i=1, \ldots, r$, minimizing the expression $\omega^T S_W \omega + \Phi(\omega)$ to solve for $w^c$
subject to the condition that $\omega^T(\mu_+ - \mu_-) = b$;
for a fixed $\omega = \omega^c$, minimizing the expression $\lambda^T \overline{S}_W \lambda + \Psi(\lambda)$ to solve for $\lambda^{ic}, \forall i=1, \ldots, r$,
subject to the condition that $$\lambda^T(\overline{\mu}_+ - \overline{\mu}_-) = b,$$

$$e'\lambda_j^i = 1,$$

$$0 \leq \lambda_j^i,$$

wherein $\overline{S}_W$, and $\overline{\mu}$ are defined with $X_j$ replaced by $\overline{X}_j$ wherein $\overline{X}_j \in R^{r_j \times \gamma}$ is a matrix containing $r_j$ new points on a $\gamma$-dimensional space wherein the row of $\overline{X}_j$ denoted by $\overline{b}_j^i$ is a vector with its nonzero elements set to $B_j^i \omega^c$; and
if $\|\lambda^{1(c+1)} - \lambda^{1c}, \ldots, \lambda^{r(c+1)} - \lambda^{rc}\|_2$ is greater than a predefined tolerance, replacing $\lambda^{ic}$ by $\lambda^{i(c+1)}$ and c by c+1 and repeating the two previous steps.

17. The computer readable program storage device of claim 16, the method further comprising setting convex-hull coefficients of negative bags to be 1.

18. The computer readable program storage device of claim 16, the method further comprising transforming said feature samples into a higher dimensional space using a kernel transformation $(X\{+\}, X)$ for the positive class and $K(X\{-\}, X)$ for the negative class, wherein $X\{+\}, X\{-\}$, and $X$ are data matrices for positive, negative and all samples respectively, wherein each row is a sample vector in these matrices, wherein if the size of X is too large, subsampling a random subset from said original feature samples.

19. The computer readable program storage device of claim 15, wherein $\Phi(\omega) = \epsilon\|\omega\|_2^2$ and $\Psi(\lambda) = \epsilon\|\lambda\|_2^2$, wherein $\epsilon$ is a positive regularization parameter.

* * * * *